US012763021B2

(12) United States Patent
Lee et al.

(10) Patent No.: US 12,763,021 B2
(45) Date of Patent: Oct. 13, 2026

(54) DISPLAY DEVICE INCLUDING A LIGHT-EMITTING ELEMENT

(71) Applicant: Samsung Display Co., LTD., Yongin-si (KR)

(72) Inventors: Dae-Sik Lee, Yongin-si (KR); Seyun Kim, Yongin-si (KR); Kihyun Pyun, Yongin-si (KR); Seungho Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/078,112

(22) Filed: Mar. 12, 2025

(65) Prior Publication Data

US 2025/0384832 A1 Dec. 18, 2025

(30) Foreign Application Priority Data

Jun. 12, 2024 (KR) ........................ 10-2024-0076068

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0247* (2013.01); *G09G 2330/021* (2013.01); *G09G 2330/028* (2013.01); *G09G 2340/0435* (2013.01)

(58) Field of Classification Search
CPC ......... G09G 3/3233; G09G 2300/0819; G09G 2300/0842; G09G 2310/08; G09G 2320/0247; G09G 2330/021; G09G 2330/028; G09G 2340/0435
See application file for complete search history.

(56) References Cited

U.S. PATENT DOCUMENTS

| | | | | |
|---|---|---|---|---|
| 2016/0071445 A1* | 3/2016 | Kim | G09G 3/3291 | 345/212 |
| 2019/0156783 A1* | 5/2019 | Kim | G09G 3/3674 | |
| 2020/0243012 A1* | 7/2020 | Jin | H10D 86/423 | |
| 2022/0199017 A1* | 6/2022 | Kim | G09G 3/3258 | |

(Continued)

FOREIGN PATENT DOCUMENTS

| | | |
|---|---|---|
| CN | 117219024 A | 12/2023 |
| KR | 10-1155898 B1 | 6/2012 |

(Continued)

*Primary Examiner* — Ryan A Lubit
(74) *Attorney, Agent, or Firm* — Womble Bond Dickinson (US) LLP

(57) ABSTRACT

A display device includes a display panel including data lines, sensing lines, and pixels connected to the data lines and the sensing lines and including a light-emitting element, and a panel driver configured to provide a scan signal and a sensing signal to the pixels, to provide data voltages to the pixels through the data lines, to provide an initialization voltage to an anode of the light-emitting element through the sensing lines, to provide a first power supply voltage to the pixels, and to provide a second power supply voltage to a cathode of the light-emitting element of the pixels, wherein the light-emitting element is configured to be initialized based on a voltage difference between the initialization voltage and the second power supply voltage being less than a turn-on voltage of the light-emitting element by a margin voltage.

16 Claims, 19 Drawing Sheets

(56) References Cited

U.S. PATENT DOCUMENTS

| | | | | |
|---|---|---|---|---|
| 2022/0199018 | A1* | 6/2022 | Jeon | G09G 3/3233 |
| 2022/0208094 | A1* | 6/2022 | Jang | G09G 3/3258 |
| 2022/0270528 | A1* | 8/2022 | Ha | G09G 3/006 |
| 2022/0319368 | A1* | 10/2022 | Pyun | G09G 3/3291 |
| 2022/0335881 | A1* | 10/2022 | Kim | G09G 3/32 |
| 2022/0375414 | A1* | 11/2022 | Kim | G09G 3/3275 |
| 2023/0012381 | A1* | 1/2023 | Lee | G09G 3/3266 |
| 2023/0145644 | A1* | 5/2023 | Shin | G09G 3/3233<br>345/212 |
| 2023/0178031 | A1* | 6/2023 | Chung | G09G 3/3233 |
| 2023/0178033 | A1* | 6/2023 | Kim | G09G 3/2003<br>345/204 |
| 2023/0410729 | A1* | 12/2023 | Gai | G09G 3/32 |

FOREIGN PATENT DOCUMENTS

| | | | |
|---|---|---|---|
| KR | 10-2023-0009261 | A | 1/2023 |
| KR | 10-2023-0028672 | A | 3/2023 |

* cited by examiner

DISPLAY DEVICE INCLUDING A LIGHT-EMITTING ELEMENT

CROSS-REFERENCE TO RELATED APPLICATION(S)

The present application claims priority to, and the benefit of, Korean Patent Application No. 10-2024-0076068, filed on Jun. 12, 2024, in the Korean Intellectual Property Office, the entire disclosure of which is incorporated herein by reference.

BACKGROUND

1. Field

Embodiments of the present disclosure relate to a display device in which each pixel includes a light-emitting element.

2. Description of the Related Art

A display device may include a display panel that includes a plurality of pixels, and a panel driver that drives the display panel. The panel driver may include a scan driver that provides scan signals to the plurality of pixels, a data driver that provides data voltages to the plurality of pixels, and a controller that controls the scan driver and the data driver.

Recently, a variable frame mode (e.g., Free-Sync, G-Sync, etc.) has been developed in which the panel driver drives the display panel at a variable frequency. In a display device that operates in the variable frame mode, a flicker phenomenon may occur when a driving frequency for the display panel is changed.

SUMMARY

Some embodiments provide a display device having an improved image quality.

According to embodiments, there is provided a display device including a display panel including data lines, sensing lines, and pixels connected to the data lines and the sensing lines and including a light-emitting element, and a panel driver configured to provide a scan signal and a sensing signal to the pixels, to provide data voltages to the pixels through the data lines, to provide an initialization voltage to an anode of the light-emitting element through the sensing lines, to provide a first power supply voltage to the pixels, and to provide a second power supply voltage to a cathode of the light-emitting element of the pixels, wherein the light-emitting element is configured to be initialized based on a voltage difference between the initialization voltage and the second power supply voltage being less than a turn-on voltage of the light-emitting element by a margin voltage.

The initialization voltage may be positive, and the second power supply voltage may be negative.

The initialization voltage may be substantially equal to the turn-on voltage of the light-emitting element less the margin voltage, wherein the second power supply voltage is substantially equal to a ground voltage.

The pixels may include a capacitor including a first electrode connected to a gate node, and a second electrode connected to a source node, a first transistor including a gate connected to the gate node, a first terminal configured to receive the first power supply voltage, and a second terminal connected to the source node, a second transistor configured to connect a corresponding one of the data lines to the gate node in response to the scan signal, a third transistor configured to connect a corresponding one of the sensing lines to the source node in response to the sensing signal, and the light-emitting element including the anode connected to the source node, and the cathode configured to receive the second power supply voltage.

The panel driver may include a first voltage generator configured to generate the first power supply voltage, which is positive, based on a first input voltage, and a second voltage generator configured to generate the second power supply voltage, which is negative, based on the first input voltage.

In a power-on period of the display device, the second power supply voltage may be configured to be activated, and the first power supply voltage may be configured to be activated thereafter.

In a power-off period of the display device, the first power supply voltage may be configured to be deactivated, and the second power supply voltage may be configured to be deactivated thereafter.

The panel driver may further include a power management circuit including an initialization voltage generator configured to generate the initialization voltage based on a second input voltage, and a sensing circuit configured to provide the initialization voltage to the pixels through the sensing lines in a driving period, and to perform a sensing operation for the pixels through the sensing lines in a sensing period.

The panel driver may further include a controller configured to generate a positive voltage enable signal and a negative voltage enable signal, wherein the second voltage generator is configured to generate the second power supply voltage in response to the negative voltage enable signal, and wherein the power management circuit further includes a positive voltage generator configured to generate a positive voltage in response to the positive voltage enable signal.

In the driving period, the positive voltage enable signal may have an off-level, the negative voltage enable signal may have an on-level, and the cathode of the light-emitting element may be configured to receive the second power supply voltage, wherein, in the sensing period, the positive voltage enable signal has an on-level, the negative voltage enable signal has an off-level, and the cathode of the light-emitting element is configured to receive the positive voltage generated by the positive voltage generator.

The panel driver may include a suitable power supply voltage storage configured to store a suitable voltage level determined by measuring a luminance of the display panel while gradually changing a voltage level of the second power supply voltage, wherein the panel driver is configured to generate the second power supply voltage having the suitable voltage level.

The panel driver may include a temperature sensor configured to measure a temperature of the display panel, wherein the panel driver is configured to adjust a voltage level of the second power supply voltage according to the temperature.

The panel driver may be configured to increase the voltage level of the second power supply voltage as the temperature increases.

The panel driver may include a driving time accumulator configured to accumulate a driving time of the display panel, wherein the panel driver is configured to adjust a voltage level of the second power supply voltage according to the driving time.

The panel driver may be configured to decrease the voltage level of the second power supply voltage as the driving time increases.

The panel driver may include a suitable initialization voltage storage configured to store a suitable voltage level determined by measuring a luminance of the display panel while gradually changing a voltage level of the initialization voltage, wherein the panel driver is configured to generate the initialization voltage having the suitable voltage level.

According to embodiments, there is provided a display device including a display panel including data lines, sensing lines, and pixels connected to the data lines and the sensing lines, a scan driver configured to provide a scan signal and a sensing signal to the pixels, a data driver configured to provide data voltages to the pixels through the data lines, a first voltage generator configured to provide a first power supply voltage to the pixels, a second voltage generator configured to provide a negative second power supply voltage to the pixels, a power management circuit configured to generate a positive initialization voltage, a sensing circuit configured to provide the initialization voltage to the pixels through the sensing lines in a driving period, and to perform a sensing operation for the pixels through the sensing lines in a sensing period, and a controller configured to control the scan driver, the data driver, the first voltage generator, the second voltage generator, the power management circuit and the sensing circuit, wherein the pixels include a capacitor including a first electrode connected to a gate node, and a second electrode connected to a source node, a first transistor including a gate connected to the gate node, a first terminal configured to receive the first power supply voltage, and a second terminal connected to the source node, a second transistor configured to connect a corresponding one of the data lines to the gate node in response to the scan signal, a third transistor configured to connect a corresponding one of the sensing lines to the source node in response to the sensing signal, and a light-emitting element including an anode connected to the source node, and a cathode configured to receive the second power supply voltage.

The controller may be configured to generate a positive voltage enable signal and a negative voltage enable signal, wherein the second voltage generator is configured to generate the second power supply voltage in response to the negative voltage enable signal, and wherein the power management circuit further is configured to generate a positive voltage in response to the positive voltage enable signal.

In the driving period, the positive voltage enable signal may have an off-level, the negative voltage enable signal may have an on-level, and the cathode of the light-emitting element may be configured to receive the second power supply voltage, wherein, in the sensing period, the positive voltage enable signal has an on-level, the negative voltage enable signal has an off-level, and the cathode of the light-emitting element is configured to receive the positive voltage generated by the positive voltage generator.

According to embodiments, there is provided a display device including a display panel including data lines, sensing lines, and pixels connected to the data lines and the sensing lines and including a light-emitting element, and a panel driver configured to provide a scan signal and a sensing signal to the pixels, to provide data voltages to the pixels through the data lines, to provide a positive initialization voltage to an anode of the light-emitting element through the sensing lines, to provide a first power supply voltage, and to provide a negative second power supply voltage to a cathode of the light-emitting element, wherein the light-emitting element is configured to be initialized based on the initialization voltage and the second power supply voltage.

According to embodiments, there is provided an electronic device including a display device including a display panel including data lines, sensing lines, and pixels connected to the data lines and the sensing lines and including a light-emitting element, and a panel driver configured to provide a scan signal and a sensing signal to the pixels, to provide data voltages to the pixels through the data lines, to provide an initialization voltage to an anode of the light-emitting element through the sensing lines, to provide a first power supply voltage to the pixels, and to provide a second power supply voltage to a cathode of the light-emitting element of the pixels, wherein the light-emitting element is configured to be initialized based on a voltage difference between the initialization voltage and the second power supply voltage being less than a turn-on voltage of the light-emitting element by a margin voltage.

The electronic device may include a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, or a head-mounted display (HMD).

As described above, in a display device according to embodiments, a light-emitting element of each pixel may be initialized based on an initialization voltage applied to an anode of the light-emitting element and based on a second power supply voltage applied to a cathode of the light-emitting element, and the initialization voltage and the second power supply voltage may be set such that a voltage difference between the initialization voltage and the second power supply voltage is less than a turn-on voltage of the light-emitting element by a margin voltage. That is, the voltage difference between the initialization voltage and the second power supply voltage may be close to the turn-on voltage of the light-emitting element. Accordingly, a non-emission time of the light-emitting element when the light-emitting element is initialized may be reduced, and a flicker phenomenon may be reduced when a driving frequency is changed.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
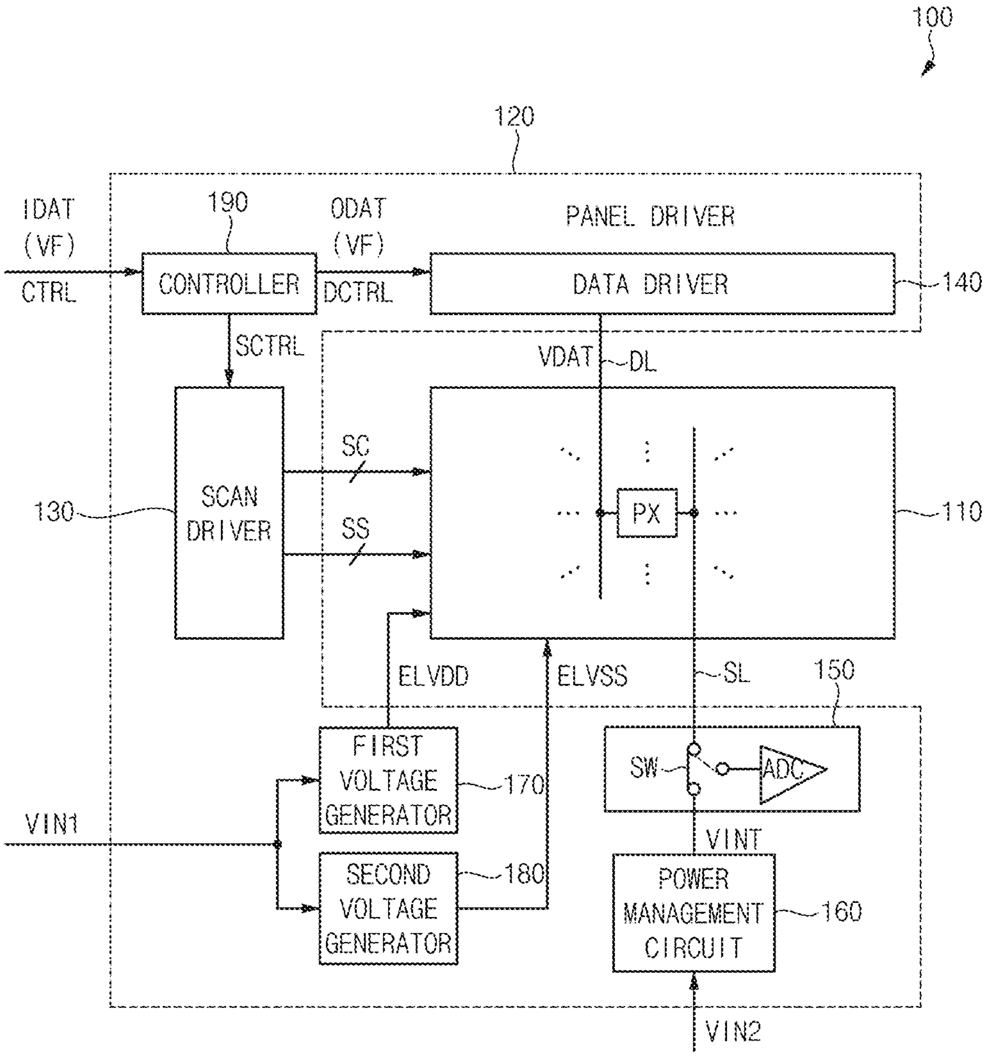
FIG. 1 is a block diagram illustrating a display device according to embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
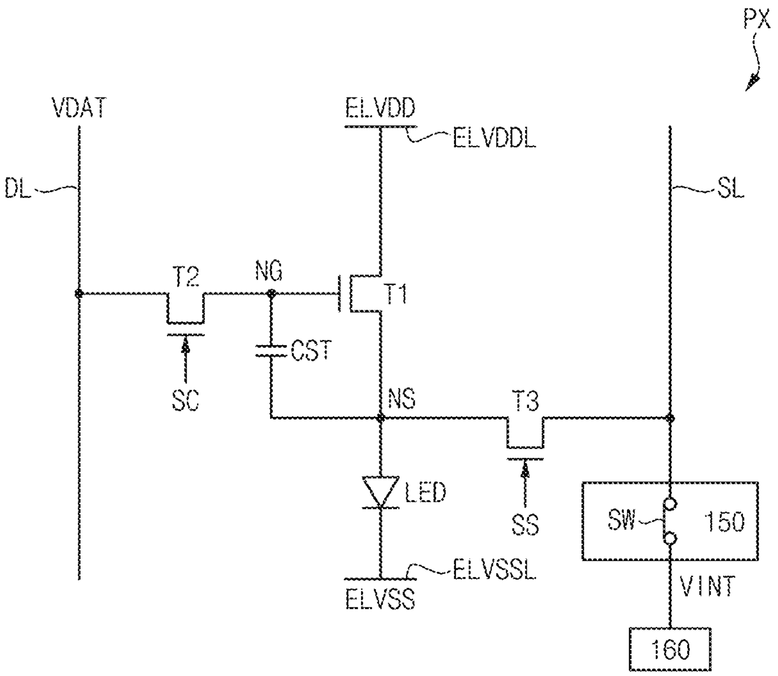
FIG. 2 is a circuit diagram illustrating an example of a pixel included in a display device according to embodiments.
Figure 3:
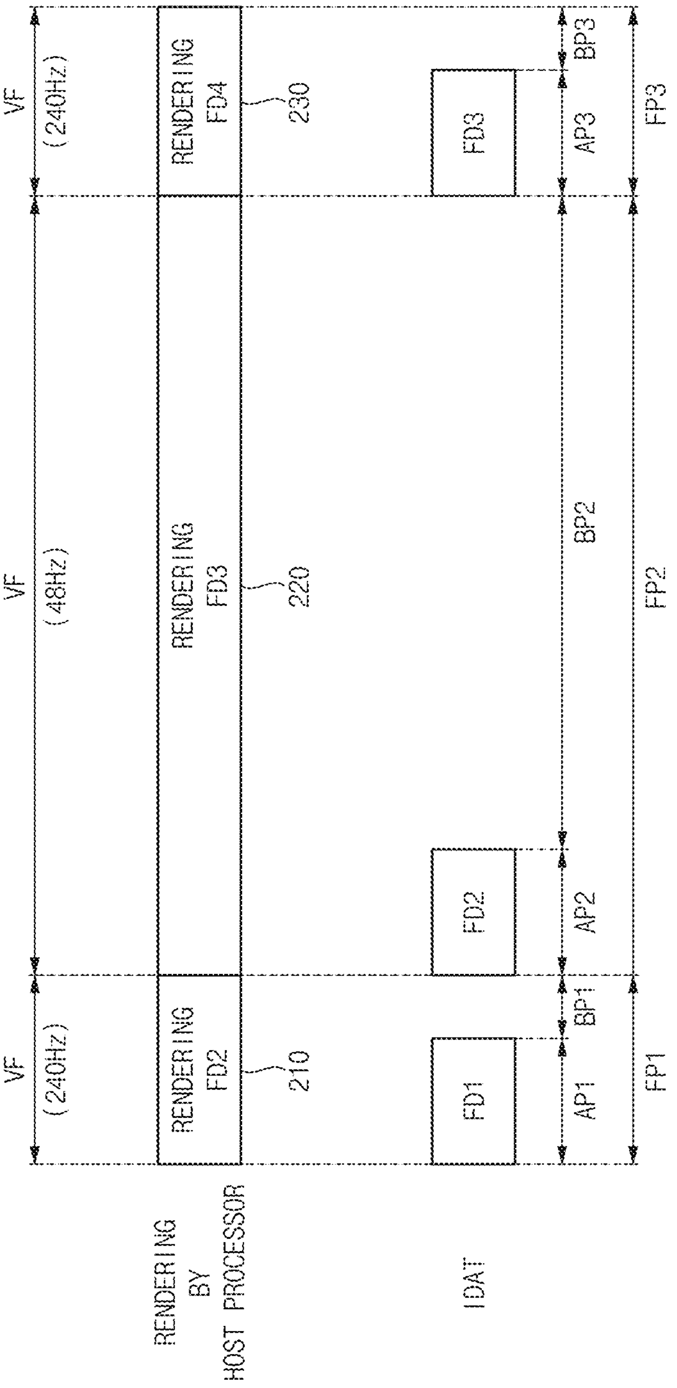
FIG. 3 is a timing diagram illustrating an example of input image data that are input to a display device at a variable frequency.
Figure 4:
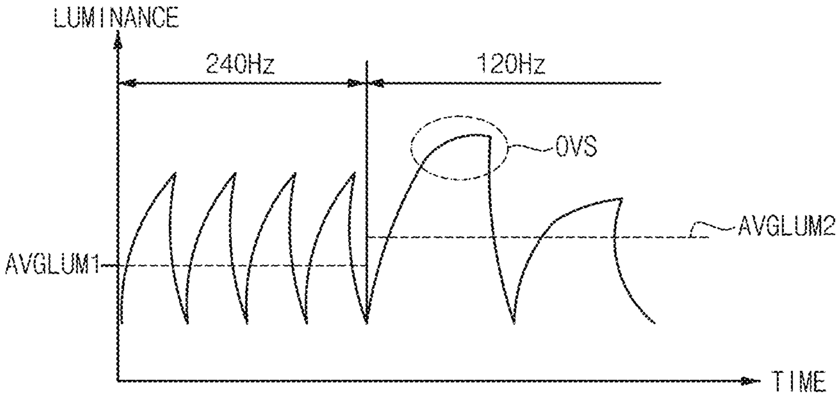
FIG. 4 is a diagram illustrating an example of luminance of a display panel of a conventional display device when a driving frequency is changed.
Figure 5:
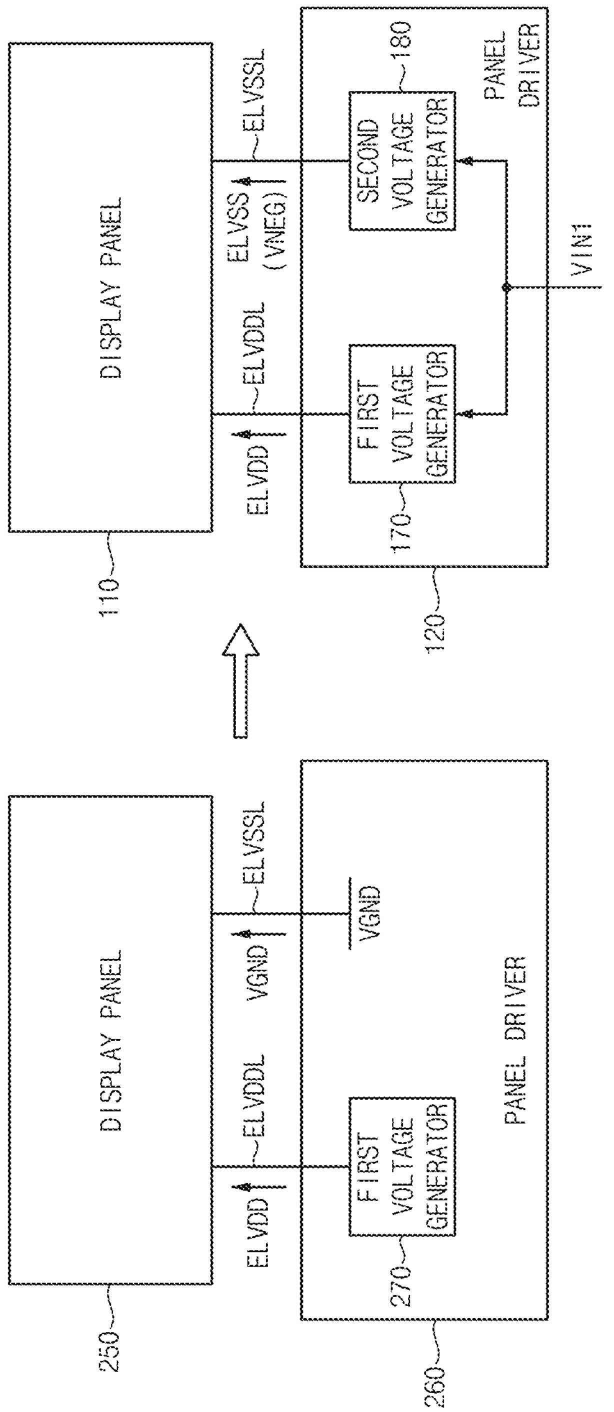
FIG. 5 is a block diagram for describing first and second power supply voltages in a conventional display device, and first and second power supply voltages in a display device according to embodiments.
Figure 6:
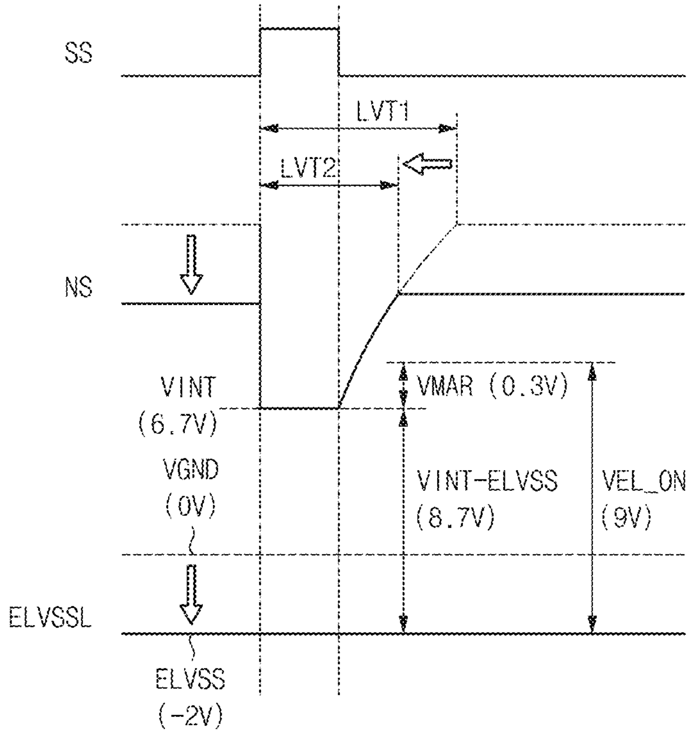
FIG. 6 is a timing diagram illustrating an example of a sensing signal, a voltage of a source node and a voltage of a second power supply voltage line for each pixel in a display device according to embodiments.

FIG. 1 is a block diagram illustrating a display device according to embodiments, FIG. 2 is a circuit diagram illustrating an example of a pixel included in a display device according to embodiments, FIG. 3 is a timing diagram illustrating an example of input image data that are input to a display device at a variable frequency, FIG. 4 is a diagram illustrating an example of luminance of a display panel of a conventional display device when a driving frequency is changed, FIG. 5 is a block diagram for describing first and second power supply voltages in a conventional display device, and first and second power supply voltages in a display device according to embodiments, and FIG. 6 is a timing diagram illustrating an example of a sensing signal, a voltage of a source node and a voltage of a second power supply voltage line for each pixel in a display device according to embodiments.

Referring to FIG. 1, a display device 100 according to embodiments may include a display panel 110 that includes a plurality of pixels PX, and a panel driver 120 that drives the display panel 110. In some embodiments, the panel driver 120 may include a scan driver 130 that provides a scan signal SC and a sensing signal SS to each of the plurality of pixels PX, a data driver 140 connected to the plurality of pixels PX through a plurality of data lines DL, a sensing circuit 150 connected to the plurality of pixels PX through a plurality of sensing lines SL, a power management circuit 160 that generates an initialization voltage VINT, a first voltage generator 170 that generates a first power supply voltage ELVDD (e.g., a high power supply voltage), a second voltage generator 180 that generates a second power supply voltage ELVSS (e.g., a low power supply voltage), and a controller 190 that controls the scan driver 130, the data driver 140, the sensing circuit 150, the power management circuit 160, the first voltage generator 170, and the second voltage generator 180.

The display panel 110 may include the plurality of data lines DL, the plurality of sensing lines SL, and the plurality of pixels PX connected to the plurality of data lines DL and the plurality of sensing lines SL. In some embodiments, the display panel 110 may further include a plurality of scan signal lines, which transfer scan signals SC, a plurality of sensing signal lines, which transfer sensing signals SS, a first power supply voltage line, which transfers the first power supply voltage ELVDD, and a second power supply voltage line, which transfers the second power supply voltage ELVSS. Each pixel PX may include a light-emitting element, and the display panel 110 may be a light-emitting display panel.

For example, as illustrated in FIG. 2, each pixel PX may have a 3T1C structure including a first transistor T1, a second transistor T2, a third transistor T3, a capacitor CST, and a light-emitting element LED.

The capacitor CST may store a data voltage VDAT transferred through the second transistor T2 from the data line DL. The capacitor CST may be referred to as a storage capacitor for storing the data voltage VDAT, but is not limited thereto. In some embodiments, the capacitor CST may include a first electrode connected to a gate node NG, and a second electrode connected to a source node NS.

The first transistor T1 may generate a driving current based on the data voltage VDAT stored in the capacitor CST. The first transistor T1 may be referred to as a driving transistor for generating the driving current, but is not limited thereto. In some embodiments, the first transistor T1 may include a gate connected to the gate node NG, a first terminal (e.g., a drain), which receives the first power supply voltage ELVDD, and a second terminal (e.g., a source) connected to the source node NS.

The second transistor T2 may connect the data line DL to the gate node NG in response to the scan signal SC. That is, the second transistor T2 may transfer the data voltage VDAT from the data line DL to the gate node NG in response to the scan signal SC. The second transistor T2 may be referred to as a scan transistor, but is not limited thereto. In some embodiments, the second transistor T2 may include a gate, which receives the scan signal SC, a first terminal connected to the data line DL, and a second terminal connected to the gate node NG.

The third transistor T3 may connect the sensing line SL to the source node NS in response to the sensing signal SS. In a driving period in which the display panel 110 displays an image, a switch SW of a sensing circuit 150 may connect the sensing line SL to the power management circuit 160, and the third transistor T3 may transfer the initialization voltage VINT from the sensing line SL to the source node NS in response to the sensing signal SS. When the initialization voltage VINT is applied to the source node NS, the light-emitting element LED may be initialized based on the initialization voltage VINT applied to an anode of the light-emitting element LED and based on the second power supply voltage ELVSS applied to a cathode of the light-emitting element LED. In a sensing period in which the sensing circuit 150 performs a sensing operation for the plurality of pixels PX, the third transistor T3 may connect the sensing line SL to the source node NS in response to the sensing signal SS, the switch SW of the sensing circuit 150 may connect the sensing line SL to an analog-to-digital converter ADC of the sensing circuit 150, and the sensing circuit 150 may sense a characteristic of the pixel PX through the sensing line SL. In some embodiments, the third transistor T3 may include a gate, which receives the sensing signal SS, a first terminal connected to the source node NS, and a second terminal connected to the sensing line SL.

The light-emitting element LED may emit light based on the driving current flowing from the first power supply voltage line ELVDDL to the second power supply voltage line ELVSSL. In some embodiments, the light-emitting element LED may include the anode connected to the source node NS, and the cathode, which receives the second power supply voltage ELVSS. In some embodiments, the light-emitting element LED may be an organic light-emitting diode ("OLED"). In other embodiments, the light-emitting element LED may be a nano light-emitting diode ("NED"), a quantum dot ("QD") light-emitting diode, a micro light-emitting diode, an inorganic light-emitting diode, or any other suitable light-emitting element.

In some embodiments, as illustrated in FIG. 2, the first, second, and third transistors T1, T2, and T3 may be implemented as, but are not limited to, N-type metal oxide semiconductor ("NMOS") transistors. Further, although FIG. 2 illustrates an example of the pixel PX having the 3T1C structure, the pixel PX according to embodiments is not limited to the example of FIG. 2.

The scan driver 130 may generate the scan signals SC and the sensing signals SS based on a scan control signal SCTRL received from the controller 190, may sequentially provide the scan signals SC to the plurality of pixels PX on a row-by-row basis through the plurality of scan signal lines, and may sequentially provide the sensing signals SS to the plurality of pixels PX on a row-by-row basis through the plurality of sensing signal lines. In some embodiments, the scan control signal SCTRL may include a scan start signal and a scan clock signal, but is not limited thereto. In some embodiments, the scan driver 130 may be integrated or formed in the display panel 110. In other embodiments, the scan driver 130 may be implemented with one or more integrated circuits.

The data driver 140 may generate the data voltages VDAT based on a data control signal DCTRL and output image data ODAT received from the controller 190, and may provide the data voltages VDAT to the plurality of pixels PX through the plurality of data lines DL. In some embodiments, the data control signal DCTRL may include, but is not limited to, an output data enable signal, a horizontal start signal, and a load signal. Further, in some embodiments, the data driver 140 may receive the output image data ODAT from the controller 190 at a variable frequency VF (e.g., ranging from about 48 Hz to about 240 Hz). In some embodiments, the data driver 140 and the sensing circuit 150 may be implemented as a single integrated circuit, which may be referred to as a readout source driver integrated circuit ("RSIC"). In other embodiments, the data driver 140 and the controller 190 may be implemented as a single integrated circuit, which may be referred to as a timing controller embedded data driver ("TED") integrated circuit. In still other embodiments, the data driver 140, the sensing circuit 150 and the controller 190 may be implemented as separate integrated circuits.

The power management circuit 160, the first voltage generator 170, and the second voltage generator 180 may respectively generate voltages VINT, ELVDD, and ELVSS required for an operation of the display device 100. In some embodiments, the first voltage generator 170 may generate the first power supply voltage ELVDD that is a positive voltage based on a first input voltage VIN1, and the second voltage generator 180 may generate the second power supply voltage ELVSS that is a negative voltage based on the first input voltage VIN1. The first voltage generator 170 may provide the first power supply voltage ELVDD to the plurality of pixels PX through the first power supply voltage line ELVDDL, and the second voltage generator 180 may provide the second power supply voltage ELVSS to the plurality of pixels PX through the second power supply voltage line ELVSSL. Further, the power management circuit 160 may generate the initialization voltage VINT for initializing the light-emitting element LED based on a second input voltage VIN2. According to embodiments, the second input voltage VIN2 may be different from the first input voltage VIN1, or may be substantially the same as the first input voltage VIN1. In some embodiments, the power management circuit 160, the first voltage generator 170, and the second voltage generator 180 may include, but are not limited to, a buck converter and/or a linear regulator for respectively converting the first and second input voltages VIN1 and VIN2 to desired voltages VINT, ELVDD, and ELVSS. Further, in some embodiments, the power management circuit 160, the first voltage generator 170, and the second voltage generator 180 may be implemented as separate integrated circuits. In other embodiments, at least two of the power management circuit 160, the first voltage generator 170, and the second voltage generator 180 may be implemented as a single integrated circuit.

The sensing circuit 150 may provide the initialization voltage VINT generated by the power management circuit 160 to the plurality of pixels PX through the plurality of sensing lines SL in the driving period, and may perform the sensing operation that senses the characteristics (e.g., a threshold voltage and/or mobility of the first transistor T1) of the plurality of pixels PX through the plurality of sensing lines SL in the sensing period. In some embodiments, the sensing circuit 150 may include the switch SW that selectively connects the sensing line SL to the power management circuit 160 or to the analog-to-digital converter ADC, and also may include the analog-to-digital converter ADC that converts an analog signal (a voltage or a current) of the sensing line SL into a digital signal. The switch SW may connect the sensing line SL to the power management circuit 160 in the driving period, and may connect the sensing line SL to the analog-to-digital converter ADC in the sensing period. The analog-to-digital converter ADC may convert the analog signal received from the pixel PX through the sensing line SL into digital sensing data, and the sensing circuit 150 may provide the digital sensing data representing the characteristic of the pixel PX to the controller 190.

The controller 190 (e.g., a timing controller) may receive input image data IDAT and a control signal CTRL from an external host processor (e.g., a graphics processing unit ("GPU"), an application processor ("AP") or a graphics card). In some embodiments, the input image data IDAT may be RGB image data including red image data, green image data, and blue image data. Further, in some embodiments, the control signal CTRL may include, but is not limited to, a vertical synchronization signal, a horizontal synchronization signal, a data enable signal, a master clock signal, and the like. The controller 190 may generate the output image data ODAT, the data control signal DCTRL, and the scan control signal SCTRL based on the input image data IDAT and the control signal CTRL. The controller 190 may control an operation of the scan driver 130 by providing the scan control signal SCTRL to the scan driver 130, and may control an operation of the data driver 140 by providing the output image data ODAT and the data control signal DCTRL to the data driver 140.

The host processor may provide the input image data IDAT to the display device 100 at a variable frequency VF (or a variable frame rate) by changing a time length of a blank period in each frame period. The controller 190 may receive the input image data IDAT at the variable frequency VF from the host processor. Further, in the display device 100 according to embodiments, the controller 190 may control the scan driver 130 and the data driver 140 to drive the display panel 110 at the variable frequency VF. In some embodiments, a mode of the display device 100 in which the display panel 110 is driven at the variable frequency VF (or the variable frame rate) may be referred to as a variable frame mode. For example, the variable frame mode may be, but is not limited to, a Free-Sync mode, a G-Sync mode, etc.

For example, as illustrated in FIG. 3, a period or a frequency of renderings 210, 220, and 230 by the host processor (e.g., the GPU, the AP, or the graphics card) may not be constant (e.g., in a case where game image data are rendered). The host processor may provide the input image data IDAT (or frame data FD1, FD2, and FD3) to the display device 100 in synchronization with these irregular periods or frequencies of the renderings 210, 220, and 230 in the variable frame mode. Thus, in the variable frame mode, each frame period FP1, FP2, and FP3 may include a constant active period AP1, AP2, and AP3 having a constant time length, and the host processor may provide the frame data FD1, FD2, and FD3 to the display device 100 at the variable frequency VF by changing a time length of a blank period BP1, BP2, and BP3 of each frame period FP1, FP2, and FP3. In an example of FIG. 3, if a rendering 210 for second frame data FD2 is performed at a frequency of about 240 Hz in a first frame period FP1, the host processor may provide first frame data FD1 to the display device 100 at the variable frequency VF of about 240 Hz in the first frame period FP1. Further, the host processor may output the second frame data FD2 during an active period AP2 of a second frame period FP2, and may continue a blank period BP2 of the second frame period FP2 until a rendering 220 for third frame data FD3 is completed. Thus, in the second frame period FP2, if the rendering 220 for the third frame data FD3 is performed at a frequency of about 48 Hz, the host processor may provide the second frame data FD2 to the display device 100 at the variable frequency VF of about 48 Hz by increasing a time length of the blank period BP2 of the second frame period FP2. In a third frame period FP3, if a rendering 230 for fourth frame data FD4 is performed again at a frequency of about 240 Hz, the host processor may provide the third frame data FD3 to the display device 100 again at the variable frequency VF of about 240 Hz.

A conventional display device that operates in the variable frame mode may have different luminances in cases where a display panel is driven at different frequencies. For example, because a light-emitting element of each pixel is initialized in each frame period, and because the light-emitting element does not emit light when the light-emitting element is initialized, as illustrated in FIG. 4, during the same time, the number of luminance valleys (or the number of times of non-emission of each pixel) of the display panel driven at about 120 Hz may be reduced compared with the number of luminance valleys of the display panel driven at about 240 Hz, and an average luminance AVGLUM2 of the display panel driven at about 120 Hz may be higher than an average luminance AVGLUM1 of the display panel driven at about 240 Hz. Due to this difference in luminance according to a driving frequency, a flicker phenomenon may occur in the conventional display device when the driving frequency is changed. Further, as illustrated in FIG. 4, in the conventional display device, a luminance overshoot OVS may occur in which the luminance of the display panel undesirably increases in a first frame period immediately after the driving frequency is changed. Further, the flicker phenomenon and the luminance overshoot OVS may be aggravated as a non-emission time of the light-emitting element when the light-emitting element is initialized increases.

However, in the display device 100 according to embodiments, the initialization voltage VINT and the second power supply voltage ELVSS may be set such that a voltage difference between the initialization voltage VINT and the second power supply voltage ELVSS is close to a turn-on voltage of the light-emitting element LED (e.g., an average turn-on voltage or a lowest turn-on voltage of the light-emitting elements LED of the plurality of pixels PX). Thus, the non-emission time of the light-emitting element LED when the light-emitting element LED is initialized may be reduced. In some embodiments, the initialization voltage VINT may be set to a positive voltage, and the second power supply voltage ELVSS may be set to a negative voltage.

For example, as illustrated in FIG. 5, in a conventional display device, a panel driver 260 may include a first voltage generator 270 that provides a first power supply voltage ELVDD (e.g., a high power supply voltage) to a first power supply voltage line ELVDDL of the display panel 250, but may not include a second voltage generator that generates a second power supply voltage (e.g., a low power supply voltage). In the conventional display device, a ground voltage VGND may be used as the second power supply voltage. That is, the panel driver 260 may provide the ground voltage VGND to a second power supply voltage line ELVSSL of the display panel 250, and the ground voltage VGND may be applied to a cathode of a light-emitting element of each pixel.

However, in the display device 100 according to embodiments, the panel driver 120 may include not only the first voltage generator 170 that generates the first power supply voltage ELVDD that is the positive voltage based on the first input voltage VIN1, but also the second voltage generator 180 that generates the second power supply voltage ELVSS that is the negative voltage VNEG based on the first input voltage VIN1. The panel driver 120 may provide the first power supply voltage ELVDD to the first power supply voltage line ELVDDL of the display panel 110, and may provide the second power supply voltage ELVSS that is the negative voltage VNEG to the second power supply voltage line ELVSSL of the display panel 110. That is, in the display device 100 according to embodiments, the negative voltage VNEG instead of the ground voltage VGND may be used as the second power supply voltage ELVSS.

In a case where the negative voltage VNEG is used as the second power supply voltage ELVSS, the non-emission time of the light-emitting element LED when the light-emitting element LED is initialized in each frame period may be reduced. For example, as shown in FIG. 6, in the case where the second power supply voltage ELVSS of the second power supply voltage line ELVSSL is decreased from the ground voltage VGND of about 0 V to the negative voltage VNEG of about-2 V, a voltage of the source node NS of each pixel PX before the light-emitting element LED is initialized also may be decreased. Further, when the initialization voltage VINT of about 6.7 V is applied to the source node NS in response to the sensing signal SS, the light-emitting element LED of each pixel PX may be initialized based on the initialization voltage VINT applied to the anode of the light-emitting element LED and based on the second power supply voltage ELVSS applied to the cathode of the light-emitting element LED. The voltage difference VINT-ELVSS between the initialization voltage VINT and the second power supply voltage ELVSS in the case where the negative voltage VNEG of about −2 V is used as the second power supply voltage ELVSS may be closer to the turn-on voltage VEL_ON of the light-emitting element LED compared with a case where the ground voltage VGND of about 0 V is used as the second power supply voltage ELVSS. In this case, a degree of discharge of a parasitic capacitor of the light-emitting element LED may be reduced. Accordingly, the non-emission time LVT2 of the light-emitting element LED, when the light-emitting element LED is initialized in the case where the negative voltage VNEG of about −2 V is used as the second power supply voltage ELVSS, may be reduced compared with the non-emission time LVT1 of the light-emitting element LED when the light-emitting element LED is initialized in the case where the ground voltage VGND of about 0 V is used as the second power supply voltage ELVSS. If the non-emission time LVT2 of the light-emitting element LED is reduced, an amount or a size of the luminance valley of the display panel 110 may be reduced, and the flicker phenomenon and the luminance overshoot OVS when the driving frequency is changed may be reduced.

As described above, to reduce the non-emission time LVT2 of the light-emitting element LED, in the display device 100 according to embodiments, the initialization voltage VINT and the second power supply voltage ELVSS may be set such that the voltage difference VINT-ELVSS between the initialization voltage VINT and the second power supply voltage ELVSS is smaller by a margin voltage (e.g., predetermined margin voltage) VMAR than the turn-on voltage VEL_ON of the light-emitting element LED. For example, as illustrated in FIG. 6, the initialization voltage VINT may be set to about 6.7 V and the second power supply voltage ELVSS may be set to about −2 V, such that the voltage difference VINT-ELVSS between the initialization voltage VINT and the second power supply voltage ELVSS is less than the turn-on voltage VEL_ON of about 9 V by the margin voltage VMAR of about 0.3 V. However, the initialization voltage VINT and the second power supply voltage ELVSS are not limited to an example of FIG. 6. Further, in some embodiments, the negative voltage VNEG instead of the ground voltage VGND may be used as the second power supply voltage ELVSS. In this case, even if the initialization voltage VINT is not increased, or even if the sensing circuit 150 and/or the power management circuit 160 are not newly designed to increase the initialization voltage VINT, the voltage difference VINT-ELVSS between the initialization voltage VINT and the second power supply voltage ELVSS may become close to the turn-on voltage VEL_ON of the light-emitting element LED. Further, in the display device 100 according to embodiments, because the voltage difference VINT-ELVSS between the initialization voltage VINT and the second power supply voltage ELVSS is close to the turn-on voltage VEL_ON of the light-emitting element LED, the non-emission time LVT2 of the light-emitting element LED when the light-emitting element LED is initialized may be reduced, and the flicker phenomenon and the luminance overshoot OVS when the driving frequency is changed may be reduced.

Figure 7:
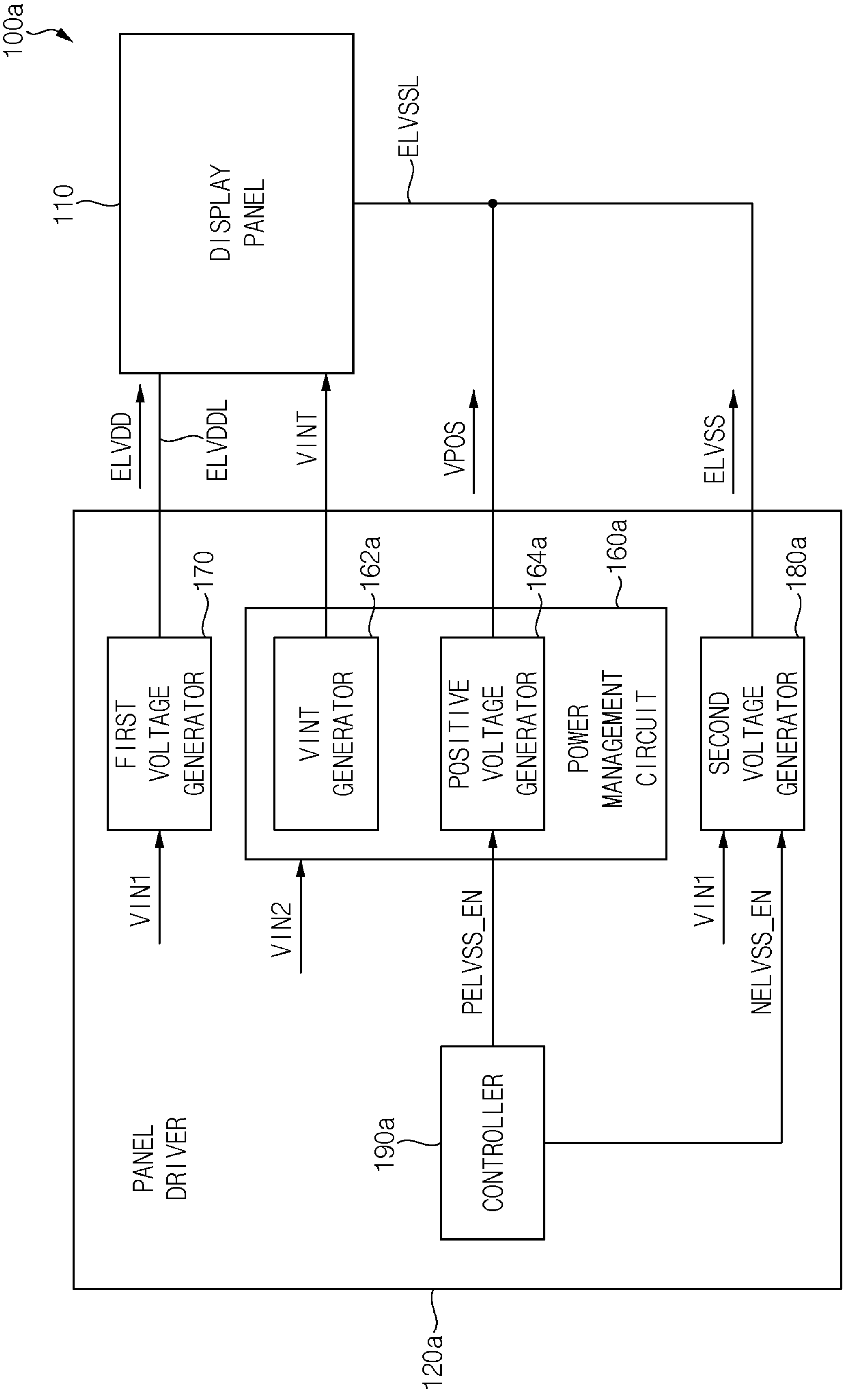
FIG. 7 is a block diagram illustrating a portion of a display device according to embodiments.
Figure 8:
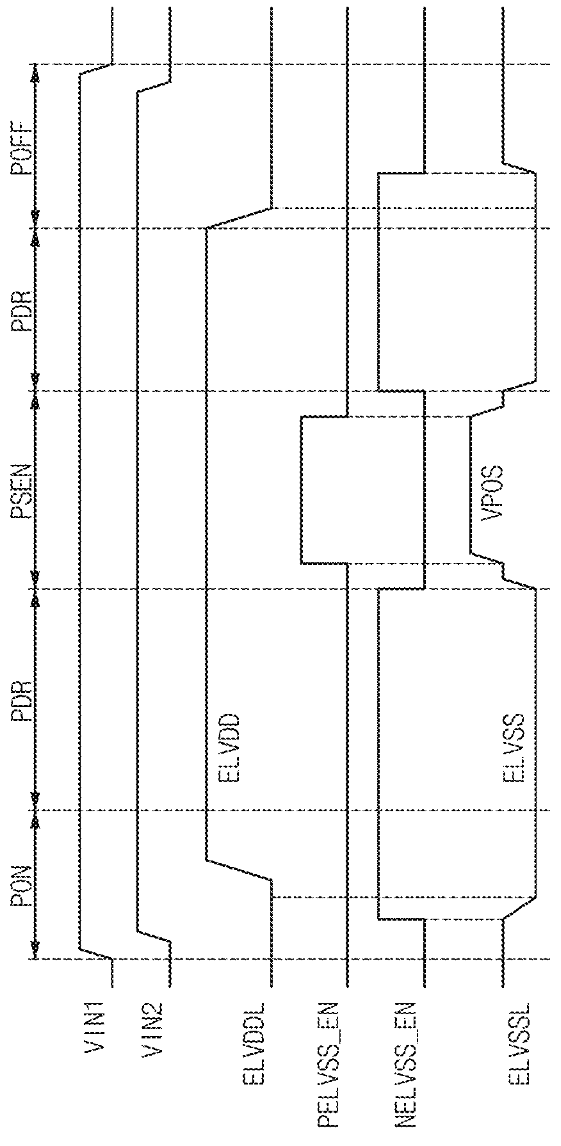
FIG. 8 is a timing diagram illustrating an example of a power sequence of a display device according to embodiments.

FIG. 7 is a block diagram illustrating a portion of a display device according to embodiments, and FIG. 8 is a timing diagram illustrating an example of a power sequence of a display device according to embodiments.

Referring to FIG. 7, a display device 100*a* according to embodiments may include a display panel 110 and a panel driver 120*a*. The panel driver 120*a* may include a power management circuit 160*a*, a first voltage generator 170, a second voltage generator 180*a*, and a controller 190*a*. In the display device 100*a* of FIG. 7, the second voltage generator 180*a* may provide a second power supply voltage ELVSS that is a negative voltage to a second power supply voltage line ELVSSL in a driving period, and the power management circuit 160*a* may provide a positive voltage VPOS to the second power supply voltage line ELVSSL in a sensing period.

The first voltage generator 170 may generate a first power supply voltage ELVDD based on a first input voltage VIN1, and may provide the first power supply voltage ELVDD to a first power supply voltage line ELVDDL of the display panel 110. The second voltage generator 180*a* may receive a negative voltage enable signal NELVSS_EN from the controller 190*a*, may generate the second power supply voltage ELVSS that is the negative voltage based on the first input voltage VIN1 in response to the negative voltage enable signal NELVSS_EN, and may provide the second power supply voltage ELVSS to the second power supply voltage line ELVSSL of the display panel 110.

In some embodiments, as illustrated in FIG. 8, in a power-on period PON of the display device 100*a*, the second power supply voltage ELVSS may be first activated, and the first power supply voltage ELVDD may be activated after the second power supply voltage ELVSS is activated. Accordingly, undesirable emission of light from a light-emitting element, when the second power supply voltage ELVSS is activated, may be reduced or prevented.

Further, in a driving period PDR in which the display panel 110 displays an image, the first voltage generator 170 may provide the first power supply voltage ELVDD to the first power supply voltage line ELVDDL of the display panel 110, an initialization voltage generator 162*a* of the power management circuit 160*a* may provide an initialization voltage VINT to the display panel 110, and the second voltage generator 180*a* may provide the second power supply voltage ELVSS to the second power supply voltage line ELVSSL of the display panel 110.

Further, in a power-off period POFF of the display device 100*a*, the first power supply voltage ELVDD may be first deactivated, and the second power supply voltage ELVSS may be deactivated after the first power supply voltage ELVDD is deactivated.

The power management circuit 160*a* may include not only the initialization voltage generator 162*a* that generates the initialization voltage VINT based on a second input voltage VIN2, but also a positive voltage generator 164*a* that generates the positive voltage VPOS in response to a positive voltage enable signal PELVSS_EN received from the controller 190*a*. In some embodiments, each of the initialization voltage generator 162*a* and the positive voltage generator 164*a* may include a linear regulator, but is not limited thereto.

As illustrated in FIG. 8, in the driving period PDR in which the display panel 110 displays the image, the controller 190*a* may generate the positive voltage enable signal PELVSS_EN having an off-level (e.g., a low level), and may generate the negative voltage enable signal NELVSS_EN having an on-level (e.g., a high level). Thus, the second voltage generator 180*a* may provide the second power supply voltage ELVSS that is the negative voltage to the second power supply voltage line ELVSSL of the display panel 110 in response to the negative voltage enable signal NELVSS_EN having the on-level, and the second power supply voltage ELVSS generated by the second voltage generator 180*a* may be provided to a cathode of the light-emitting element of each pixel of the display panel 110.

In contrast, in a sensing period PSEN in which the sensing operation is performed, the controller 190*a* may generate the positive voltage enable signal PELVSS_EN having the on-level, and may generate the negative voltage enable signal NELVSS_EN having the off-level. Thus, the positive voltage generator 164*a* of the power management circuit 160*a* may provide the positive voltage VPOS to the second power supply voltage line ELVSSL of the display panel 110, and the positive voltage VPOS generated by the positive voltage generator 164*a* may be provided to the cathode of the light-emitting element of each pixel of the display panel 110. Accordingly, in the sensing period PSEN, the light-emitting element of each pixel may not emit light.

Figure 9:
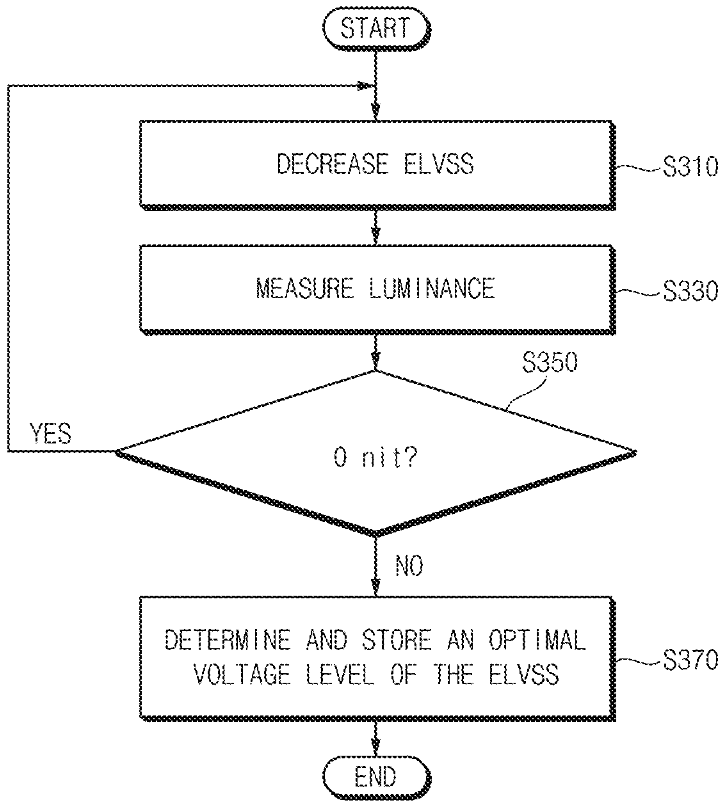
FIG. 9 is a flowchart illustrating a method of determining an acceptable voltage level of a second power supply voltage for a display device according to embodiments.
Figure 10:
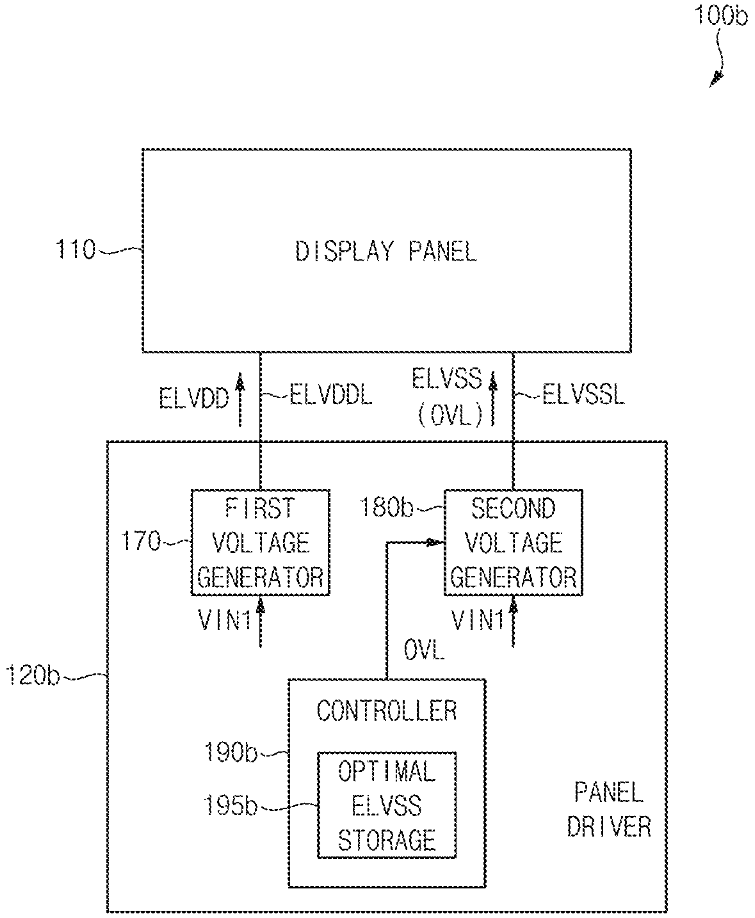
FIG. 10 is a block diagram illustrating a portion of a display device according to embodiments.

FIG. 9 is a flowchart illustrating a method of determining an acceptable (e.g., suitable or optimal) voltage level of a second power supply voltage for a display device according to embodiments, and FIG. 10 is a block diagram illustrating a portion of a display device according to embodiments.

Referring to FIGS. 9 and 10, an acceptable voltage level (e.g., optimal voltage level) OVL of a second power supply voltage ELVSS may be determined with respect to each of a plurality of display devices, and each display device 100*b* may generate the second power supply voltage ELVSS having the acceptable voltage level OVL determined for each display device 100*b*.

When each display device 100*b* is manufactured, a voltage level of the second power supply voltage ELVSS may be gradually decreased from an initial voltage level (e.g., about 0 V) (S310), and a luminance of the display panel 110 may be measured (S330). If the luminance of a display panel 110 is about 0 nit (S350: YES), or if a light-emitting element of each pixel of the display panel 110 does not emit light, the voltage level of the second power supply voltage ELVSS may be decreased again (S310), and the luminance of the display panel 110 may be measured again (S330).

If the luminance of the display panel 110 is greater than about 0 nit (S350: NO), or if the light-emitting element of each pixel of the display panel 110 emits light, the acceptable voltage level OVL of the second power supply voltage ELVSS may be determined, and the acceptable voltage level OVL may be stored in an acceptable (e.g., optimal or suitable) power supply voltage (or ELVSS) storage 195*b* of the display device 100*b* (S370). In some embodiments, the acceptable voltage level OVL of the second power supply voltage ELVSS may be determined by adding a margin voltage (e.g., predetermined margin voltage) to the second power supply voltage ELVSS when the luminance of the display panel 110 is greater than about 0 nit, but is not limited thereto.

When each display device 100*b* is driven, a controller 190*b* of a panel driver 120*b* may provide the acceptable voltage level OVL stored in the acceptable power supply voltage storage 195*b* to a second voltage generator 180*b*. In some embodiments, the acceptable power supply voltage storage 195*b* may be included in the controller 190*b*, but is not limited thereto. The second voltage generator 180*b* may generate the second power supply voltage ELVSS having the acceptable voltage level OVL based on a first input voltage VIN1, and may provide the second power supply voltage ELVSS having the acceptable voltage level OVL to a second power supply voltage line ELVSSL of the display panel 110. Accordingly, the second power supply voltages ELVSS having different voltage levels may be generated in the plurality of display devices, and each display device 100*b* may generate the second power supply voltage ELVSS that is acceptable (e.g., suitable or optimal) for each display device 100*b*.

Figure 11:
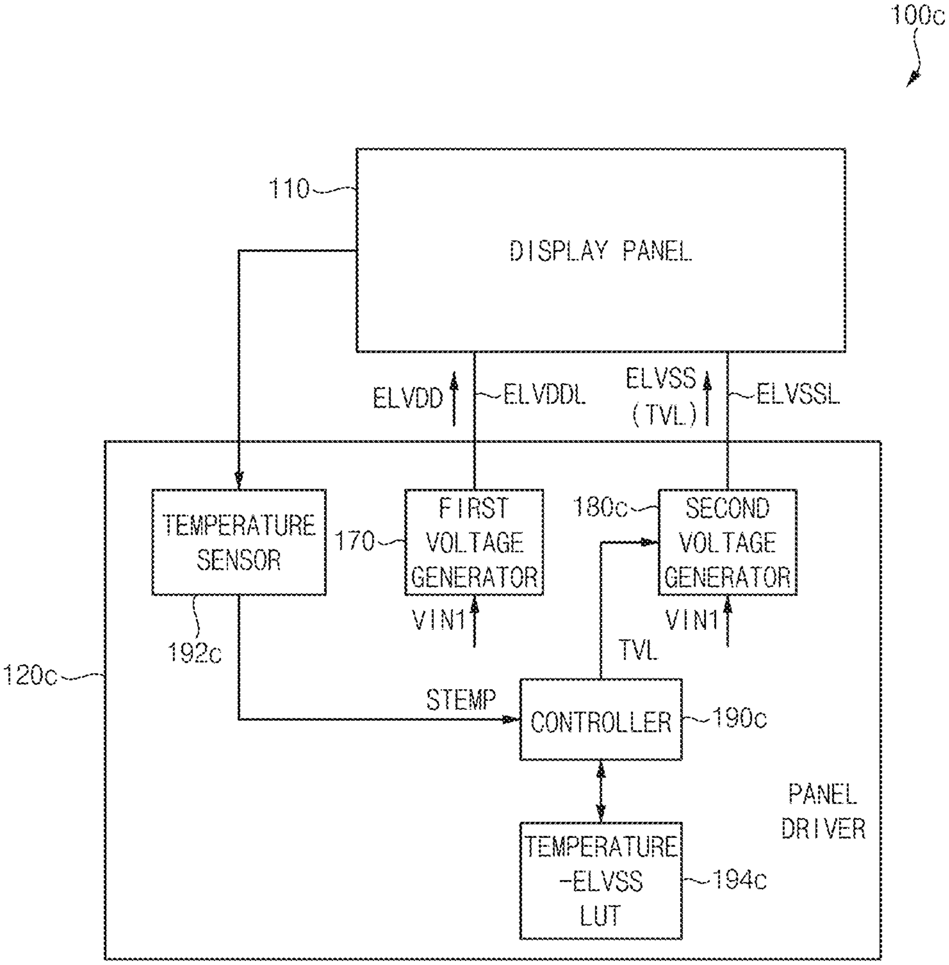
FIG. 11 is a block diagram illustrating a portion of a display device according to embodiments.
Figure 12:
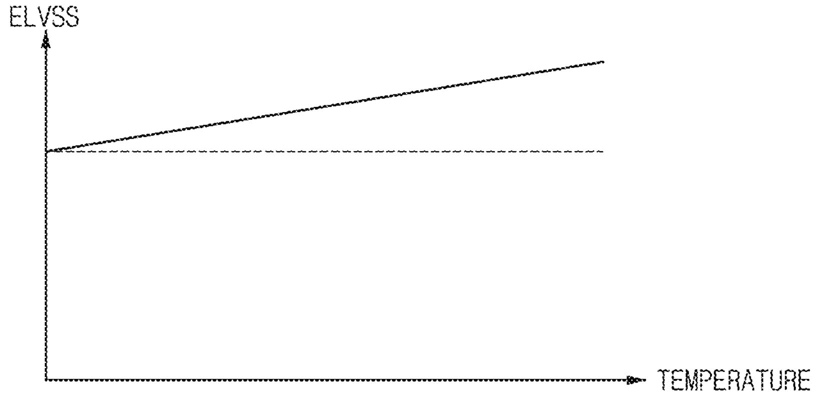
FIG. 12 is a diagram illustrating an example of a second power supply voltage according to temperature in a display device according to embodiments.

FIG. 11 is a block diagram illustrating a portion of a display device according to embodiments, and FIG. 12 is a diagram illustrating an example of a second power supply voltage according to temperature in a display device according to embodiments.

Referring to FIG. 11, a display device 100*c* according to embodiments may include a display panel 110 and a panel driver 120*c*. The panel driver 120*c* may include a first voltage generator 170, a second voltage generator 180*c*, a controller 190*c*, a temperature sensor 192*c*, and a temperature-second power supply voltage (or ELVSS) lookup table 194*c*. In the display device 100*c* of FIG. 11, a voltage level TVL of a second power supply voltage ELVSS may be adjusted according to a temperature.

The temperature sensor 192*c* may measure a temperature of the display panel 110, and may provide a temperature signal STEMP indicating the temperature of the display panel 110 to the controller 190*c*. The temperature-second power supply voltage lookup table 194*c* may store the voltage level TVL of the second power supply voltage ELVSS corresponding to each of a plurality of temperatures. The controller 190*c* may determine the voltage level TVL of the second power supply voltage ELVSS corresponding to the temperature indicated by the temperature signal STEMP by using the temperature-second power supply voltage lookup table 194*c*, and may provide the voltage level TVL of the second power supply voltage ELVSS corresponding to the temperature to the second voltage generator 180*c*. In some embodiments, as illustrated in FIG. 12, as the temperature of the display panel 110 increases, the voltage level TVL of the second power supply voltage ELVSS may increase, but is not limited thereto. Further, according to embodiments, the temperature-second power supply voltage lookup table 194*c* may be located inside or outside the controller 190*c*. The second voltage generator 180*c* may generate the second power supply voltage ELVSS having the voltage level TVL corresponding to the temperature based on a first input voltage VIN1, and may provide the second power supply voltage ELVSS having the voltage level TVL corresponding to the temperature to a second power supply voltage line ELVSSL of the display panel 110. Accordingly, increase of a luminance of the display panel 110 as the temperature of the display panel 110 increases may be reduced or prevented.

Figure 13:
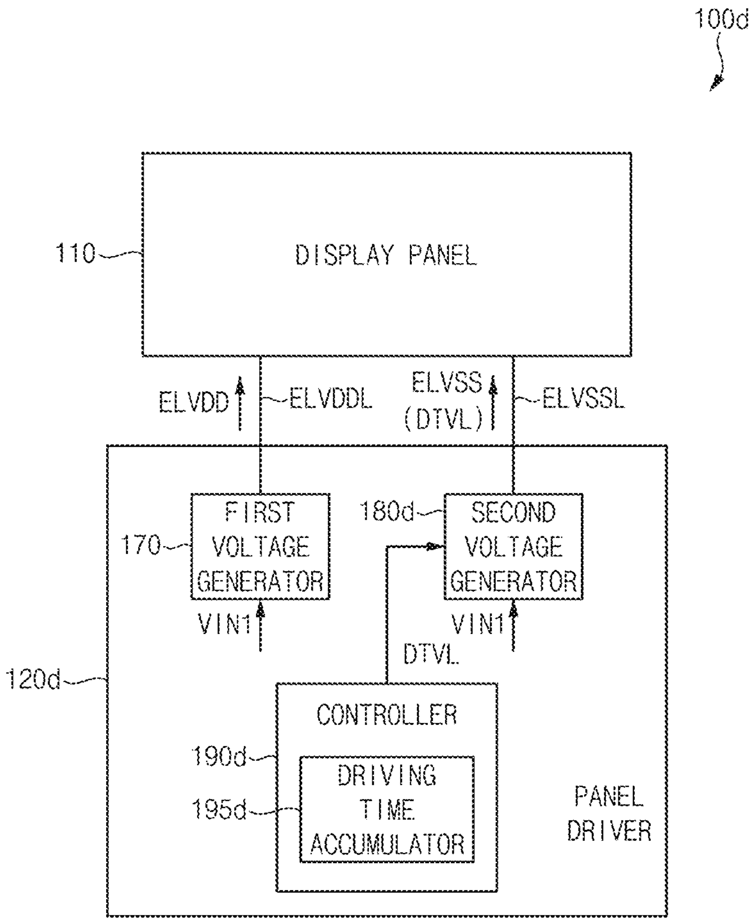
FIG. 13 is a block diagram illustrating a portion of a display device according to embodiments.
Figure 14:
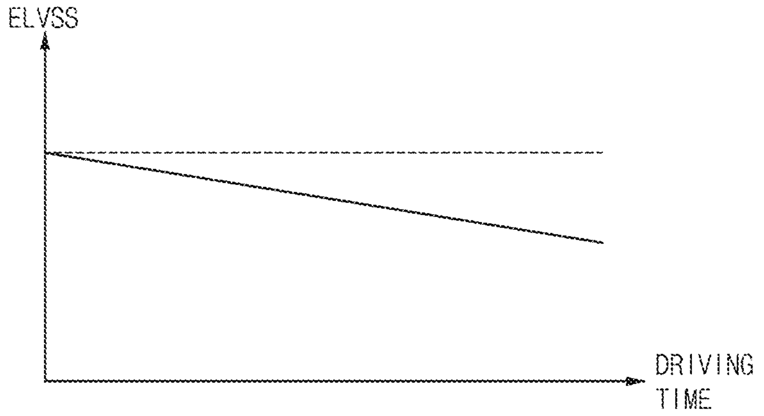
FIG. 14 is a diagram illustrating an example of a second power supply voltage according to a driving time in a display device according to embodiments.

FIG. 13 is a block diagram illustrating a portion of a display device according to embodiments, and FIG. 14 is a diagram illustrating an example of a second power supply voltage according to a driving time in a display device according to embodiments.

Referring to FIG. 13, a display device 100*d* according to embodiments may include a display panel 110 and a panel driver 120*d*. The panel driver 120*d* may include a first voltage generator 170, a second voltage generator 180*d*, and a controller 190*d* including a driving time accumulator 195*d*. In the display device 100*d* of FIG. 13, a voltage level DTVL of a second power supply voltage ELVSS may be adjusted according to a driving time of the display panel 110.

The driving time accumulator 195*d* may accumulate the driving time of the display panel 110. In some embodiments, the driving time accumulator 195*d* may accumulate the driving time of the display panel 110 by accumulating input image data IDAT, but is not limited thereto. The controller 190*d* may determine the voltage level DTVL of the second power supply voltage ELVSS according to the driving time of the display panel 110, and may provide the voltage level DTVL corresponding to the driving time to the second voltage generator 180*d*. In some embodiments, as illustrated in FIG. 14, as the driving time of the display panel 110 increases, the voltage level DTVL of the second power supply voltage ELVSS may decrease, but is not limited thereto. The second voltage generator 180*d* may generate the second power supply voltage ELVSS having the voltage level DTVL corresponding to the driving time based on a first input voltage VIN1, and may provide the second power supply voltage ELVSS having the voltage level TVL corresponding to the driving time to a second power supply voltage line ELVSSL of the display panel 110. Accordingly, decrease of a luminance of the display panel 110 as the driving time of the display panel 110 increases may be reduced or prevented.

Figure 15:
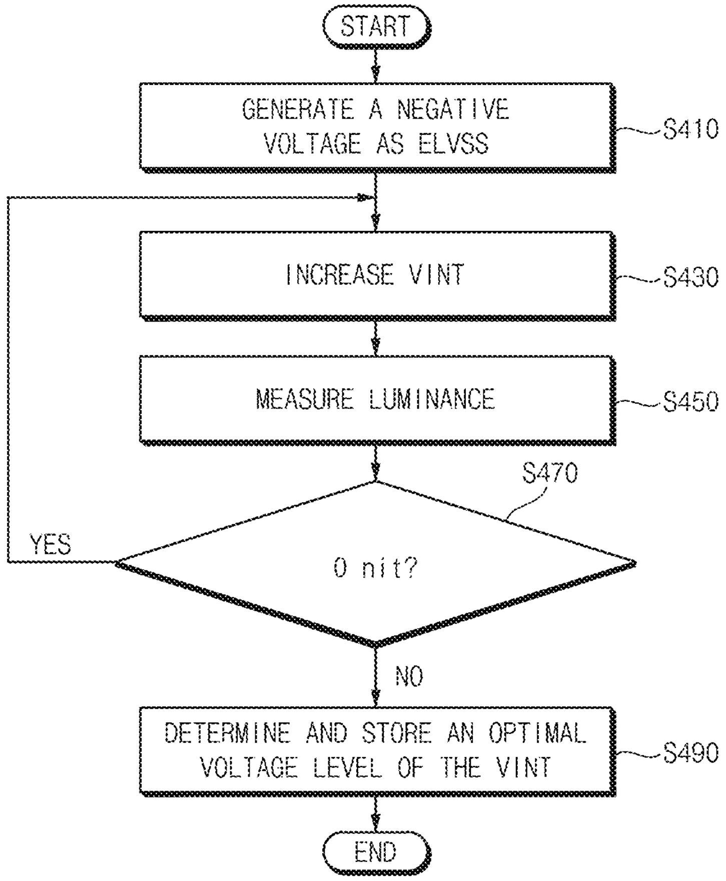
FIG. 15 is a flowchart illustrating a method of determining an acceptable voltage level of an initialization voltage for a display device according to embodiments.
Figure 16:
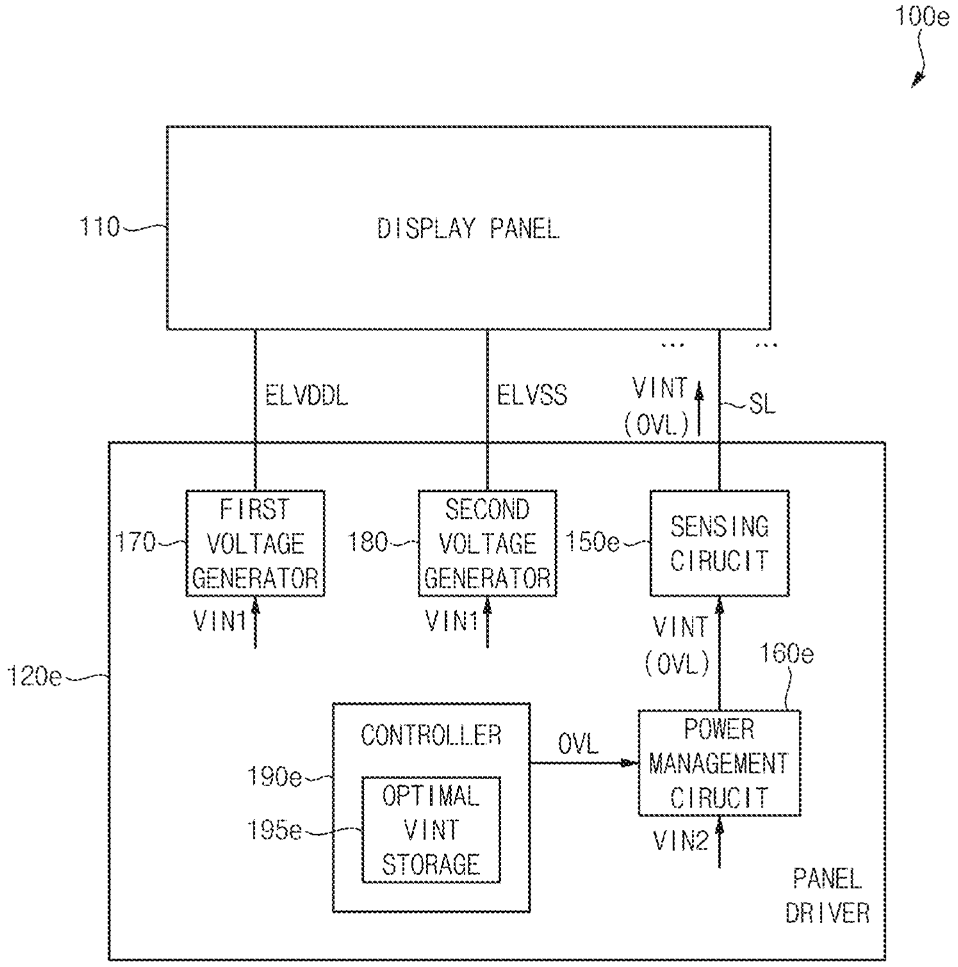
FIG. 16 is a block diagram illustrating a portion of a display device according to embodiments.

FIG. 15 is a flowchart illustrating a method of determining an acceptable voltage level (e.g., optimal voltage level) of an initialization voltage for a display device according to embodiments, and FIG. 16 is a block diagram illustrating a portion of a display device according to embodiments.

Referring to FIGS. 15 and 16, a second power supply voltage ELVSS that is substantially the same negative voltage may be used in a plurality of display devices, an acceptable voltage level (e.g., optimal voltage level) OVL of an initialization voltage VINT may be determined with respect to each of the plurality of display devices. Each display device 100*e* may generate the second power supply voltage ELVSS that is substantially the same negative voltage, and may generate the initialization voltage VINT having the acceptable voltage level OVL determined with respect to each display device 100*e*.

When each display device 100*e* is manufactured, the negative voltage that is substantially the same with respect to the plurality of display devices may be generated as the second power supply voltage ELVSS (S410), a voltage level of the initialization voltage VINT may be increased (e.g., gradually increased) from an initial voltage level (S430), and a luminance of the display panel 110 may be measured (S450). If a luminance of the display panel 110 is about 0 nit (S470: YES), or if a light-emitting element of each pixel of the display panel 110 does not emit light, the voltage level of the initialization voltage VINT may be increased again (S430), and the luminance of the display panel 110 may be measured again (S450).

If the luminance of the display panel 110 is greater than about 0 nit (S470: NO), or if the light-emitting element of each pixel of the display panel 110 emits light, the acceptable voltage level OVL of the initialization voltage VINT may be determined, and the acceptable voltage level OVL may be stored in an acceptable initialization voltage storage (e.g., optimal initialization voltage storage) 195*e* of the display device 100*e* (S490). In some embodiments, the acceptable voltage level OVL of the initialization voltage VINT may be determined by subtracting a margin voltage (e.g., predetermined margin voltage) from the initialization voltage VINT when the luminance of the display panel 110 is greater than about 0 nit, but is not limited thereto.

When each display device 100*e* is driven, a controller 190*e* of a panel driver 120*e* may provide the acceptable voltage level OVL stored in the acceptable initialization voltage storage 195*e* to a power management circuit 160*e*. In some embodiments, the acceptable initialization voltage storage 195*e* may be included in the controller 190*e*, but is not limited thereto. A second voltage generator 180 may generate the negative voltage that is substantially the same with respect to the plurality of display devices as the second power supply voltage ELVSS based on a first input voltage VIN1. The power management circuit 160*e* may generate the initialization voltage VINT having the acceptable voltage level OVL based on a second input voltage VIN2, and a sensing circuit 150*e* may provide the initialization voltage VINT having the acceptable voltage level OVL to a second power supply voltage line ELVSSL of the display panel 110. Accordingly, the initialization voltages VINT having different voltage levels may be generated in the plurality of display devices, and each display device 100*e* may generate the initialization voltage VINT that is acceptable (e.g., suitable or optimal) for each display device 100*e*.

Figure 17:
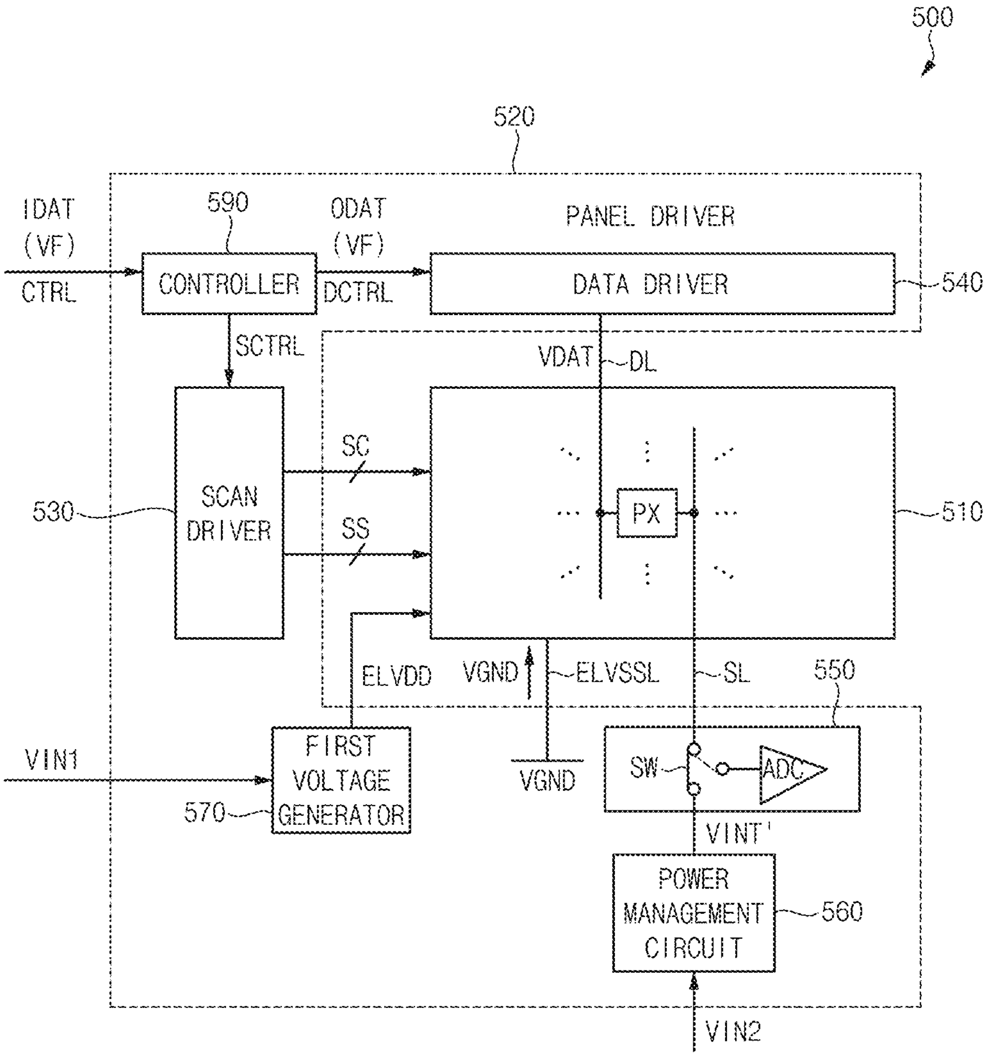
FIG. 17 is a block diagram illustrating a display device according to embodiments.
Figure 18:
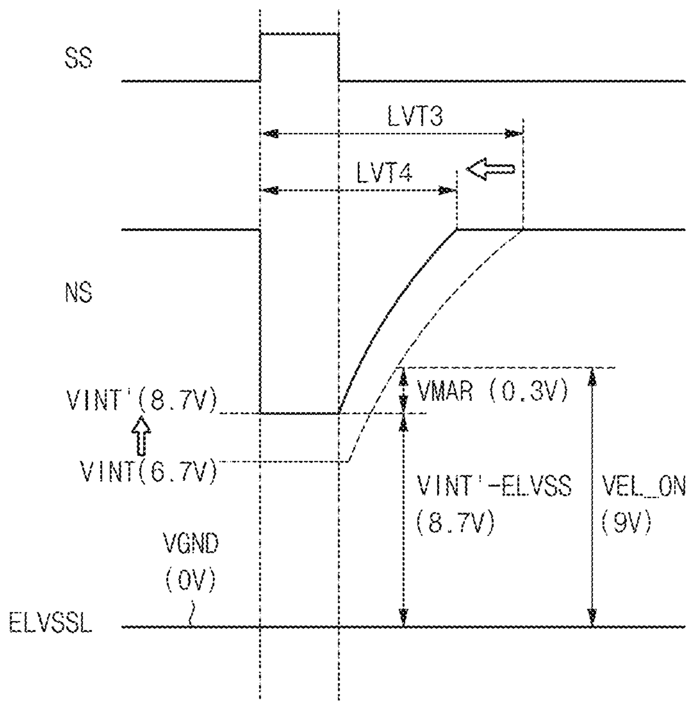
FIG. 18 is a timing diagram illustrating an example of a sensing signal, a voltage of a source node and a voltage of a second power supply voltage line for each pixel in a display device according to embodiments.

FIG. 17 is a block diagram illustrating a display device according to embodiments, and FIG. 18 is a timing diagram illustrating an example of a sensing signal, a voltage of a source node and a voltage of a second power supply voltage line for each pixel in a display device according to embodiments.

Referring to FIG. 17, a display device 500 according to embodiments may include a display panel 510 and a panel driver 520. The panel driver 520 may include a scan driver 530, a data driver 540, a sensing circuit 550, a power management circuit 560, a first voltage generator 570, and a controller 590. The display device 500 of FIG. 17 may have a similar configuration and a similar operation to a display device 100 of FIG. 1, except that the panel driver 520 may not include a second voltage generator 180 illustrated in FIG. 1, a ground voltage VGND may be provided to a second power supply voltage line ELVSSL, and the power management circuit 560 may generate an initialization voltage VINT' that is higher than an initialization voltage VINT illustrated in FIG. 1.

The panel driver 520 may provide the ground voltage VGND to the second power supply voltage line ELVSSL, and each pixel PX may receive the ground voltage VGND as a second power supply voltage. That is, in the display device 500, the ground voltage VGND may be used as the second power supply voltage.

The power management circuit 560 may generate the initialization voltage VINT' that is higher than the initialization voltage VINT illustrated in FIG. 1. In some embodiments, the initialization voltage VINT' generated by the power management circuit 560 may be a voltage obtained by subtracting a margin voltage from a turn-on voltage of a light-emitting element of each pixel PX.

For example, as illustrated in FIG. 18, the power management circuit 560 may generate the initialization voltage VINT' that is higher than the initialization voltage VINT of about 6.7 V. In one example, the turn-on voltage VEL_ON of the light-emitting element may be, but is not limited to, about 9 V, the margin voltage VMAR may be, but is not limited to, about 0.3V, and the initialization voltage VINT' may be, but is not limited to, about 8.7 V. In this case, a voltage difference VINT'-ELVSS between the initialization voltage VINT' and the second power supply voltage ELVSS may be close to the turn-on voltage VEL_ON of the light-emitting element. Accordingly, a non-emission time LVT4 of the light-emitting element when the light-emitting element is initialized in a case where the relatively high initialization voltage VINT' is used may be reduced compared with a non-emission time LVT3 of the light-emitting element when the light-emitting element is initialized in a case where the relatively low initialization voltage VINT is used. If the non-emission time LVT4 of the light-emitting element is reduced, a flicker phenomenon and a luminance overshoot when a driving frequency is changed may be reduced.

Figure 19:
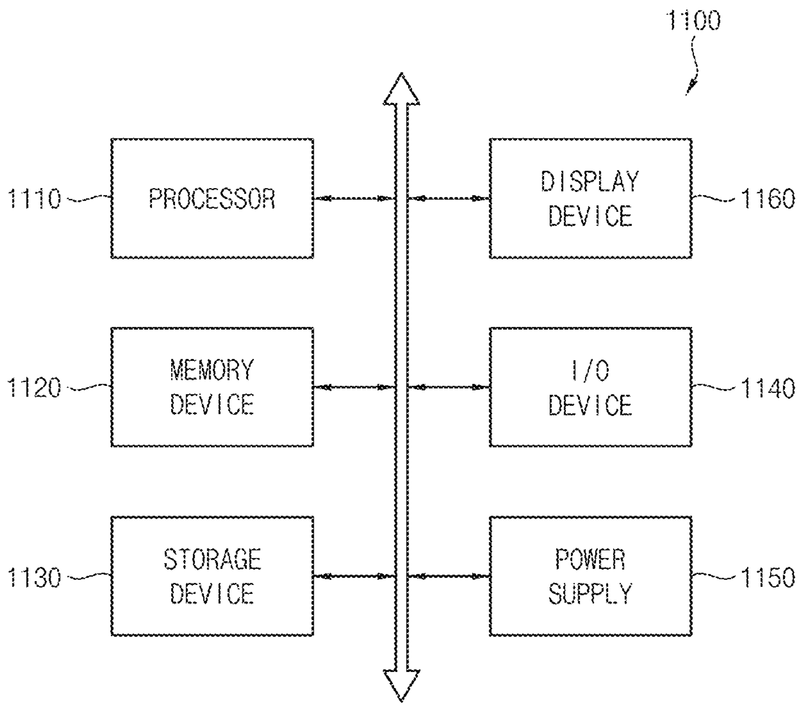
FIG. 19 is a block diagram illustrating an electronic device including a display device according to embodiments.

FIG. 19 is a block diagram illustrating an electronic device including a display device according to embodiments.

Referring to FIG. 19, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an application processor ("AP"), a micro-processor, a central processing unit ("CPU"), etc. The processor 1110 may be coupled to other components via an address bus, a control bus, a data bus, etc. Further, in some embodiments, the processor 1110 may be further coupled to an extended bus such as a peripheral component interconnection ("PCI") bus.

The memory device 1120 may store data for operations of the electronic device 1100. For example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc.

The storage device 1130 may be a solid state drive ("SSD") device, a hard disk drive ("HDD") device, a compact disc-read only memory ("CD-ROM") device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, a light-emitting element of each pixel may be initialized based on an initialization voltage applied to an anode of the light-emitting element and a second power supply voltage applied to a cathode of the light-emitting element, and the initialization voltage and the second power supply voltage may be set such that a voltage difference between the initialization voltage and the second power supply voltage is less than a turn-on voltage of the light-emitting element by a margin voltage. That is, the voltage difference between the initialization voltage and the second power supply voltage may be close to the turn-on voltage of the light-emitting element. Accordingly, a non-emission time of the light-emitting element when the light-emitting element is initialized may be reduced, and a flicker phenomenon may be reduced when a driving frequency is changed.

The disclosed embodiments may be applied any electronic device 1100 including the display device 1160. For example, the disclosed embodiments may be applied to a mobile phone, a smart phone, a virtual reality ("VR") device, a television ("TV") (e.g., a digital TV, a three-dimensional ("3D") TV, etc.), a wearable electronic device, a personal computer ("PC") (e.g. a laptop computer, a tablet computer, etc.), a home appliance, a personal digital assistant ("PDA"), a portable multimedia player ("PMP"), a digital camera, a music player, a portable game console, a navigation device, etc.

The display device of the disclosed embodiments (e.g., the display device 100, 100*a*, 100*b*, 100*c*, 100*d*, 100*e*, 500, 1160), according to one or more embodiments, is a device that displays a moving image and/or a still image. The display device may be applied to portable electronic devices such as mobile phones, smartphones, tablet personal computers (PCs), mobile communication terminals, electronic notebooks, electronic books, portable multimedia players (PMPs), navigations, and ultra-mobile PCs (UMPCs). For example, the display device may be applied to a display unit of a television, a laptop computer, a monitor, a billboard, or the Internet of Things (IoT). Alternatively, in one or more embodiments, the display device may be applied to a smartwatch, a watch phone, and/or a head-mounted display device (HMD) for implementing virtual reality and/or augmented reality.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims, with functional equivalents thereof to be included therein.

What is claimed is:

1. A display device comprising:

a display panel comprising data lines, sensing lines, and pixels connected to the data lines and the sensing lines and comprising a light-emitting element; and a panel driver configured to provide a scan signal and a sensing signal to the pixels, to provide data voltages to the pixels through the data lines, to provide an initialization voltage to an anode of the light-emitting element through the sensing lines, to provide a first power supply voltage to the pixels, and to provide a second power supply voltage to a cathode of the light-emitting element of the pixels, wherein the light-emitting element is configured to be initialized based on a voltage difference between the initialization voltage and the second power supply voltage being less than a turn-on voltage of the light-emitting element by a margin voltage, and wherein the panel driver comprises:

a controller configured to generate a positive voltage enable signal and a negative voltage enable signal;

a first voltage generator configured to generate the first power supply voltage, which is positive, based on a first input voltage;

a second voltage generator configured to generate the second power supply voltage, which is negative, based on the first input voltage, and to provide the second power supply voltage to a second power supply voltage line in response to the negative voltage enable signal; and a power management circuit comprising:

an initialization voltage generator configured to generate the initialization voltage based on a second input voltage; and a positive voltage generator configured to generate a positive voltage, and to provide the positive voltage to the second power supply voltage line in response to the positive voltage enable signal.

2. The display device of claim 1, wherein the initialization voltage is positive, and the second power supply voltage is negative.

3. The display device of claim 1, wherein the pixels comprise:

a capacitor comprising a first electrode connected to a gate node, and a second electrode connected to a source node;

a first transistor comprising a gate connected to the gate node, a first terminal configured to receive the first power supply voltage, and a second terminal connected to the source node;

a second transistor configured to connect a corresponding one of the data lines to the gate node in response to the scan signal; a third transistor configured to connect a corresponding one of the sensing lines to the source node in response to the sensing signal; and the light-emitting element comprising the anode connected to the source node, and the cathode connected to the second power supply voltage line.

4. The display device of claim 1, wherein, in a power-on period of the display device, the second power supply voltage is configured to be activated, and the first power supply voltage is configured to be activated thereafter.

5. The display device of claim 1, wherein, in a power-off period of the display device, the first power supply voltage is configured to be deactivated, and the second power supply voltage is configured to be deactivated thereafter.

6. The display device of claim 1, wherein the panel driver further comprises a sensing circuit configured to provide the initialization voltage to the pixels through the sensing lines in a driving period, and to perform a sensing operation for the pixels through the sensing lines in a sensing period.

7. The display device of claim 6, wherein, in the driving period, the positive voltage enable signal has an off-level, the negative voltage enable signal has an on-level, and the cathode of the light-emitting element is configured to receive the second power supply voltage, and wherein, in the sensing period, the positive voltage enable signal has an on-level, the negative voltage enable signal has an off-level, and the cathode of the light-emitting element is configured to receive the positive voltage generated by the positive voltage generator.

8. The display device of claim 1, wherein the panel driver further comprises a suitable power supply voltage storage configured to store a suitable voltage level determined by measuring a luminance of the display panel while gradually changing a voltage level of the second power supply voltage, and wherein the panel driver is configured to generate the second power supply voltage having the suitable voltage level.

9. The display device of claim 1, wherein the panel driver further comprises a temperature sensor configured to measure a temperature of the display panel, and wherein the panel driver is configured to adjust a voltage level of the second power supply voltage according to the temperature.

10. The display device of claim 9, wherein the panel driver is configured to increase the voltage level of the second power supply voltage as the temperature increases.

11. The display device of claim 1, wherein the panel driver further comprises a driving time accumulator configured to accumulate a driving time of the display panel, and wherein the panel driver is configured to adjust a voltage level of the second power supply voltage according to the driving time.

12. The display device of claim 11, wherein the panel driver is configured to decrease the voltage level of the second power supply voltage as the driving time increases.

13. The display device of claim 1, wherein the panel driver further comprises a suitable initialization voltage storage configured to store a suitable voltage level determined by measuring a luminance of the display panel while gradually changing a voltage level of the initialization voltage, and wherein the panel driver is configured to generate the initialization voltage having the suitable voltage level.

14. A display device comprising:

a display panel comprising data lines, sensing lines, and pixels connected to the data lines and the sensing lines and comprising a light-emitting element; and a panel driver configured to provide a scan signal and a sensing signal to the pixels, to provide data voltages to the pixels through the data lines, to provide a positive initialization voltage to an anode of the light-emitting element through the sensing lines, to provide a first power supply voltage, and to provide a negative second power supply voltage to a cathode of the light-emitting element, wherein the light-emitting element is configured to be initialized based on the initialization voltage and the second power supply voltage, and wherein the panel driver comprises:

a controller configured to generate a positive voltage enable signal and a negative voltage enable signal;

a first voltage generator configured to generate the first power supply voltage, which is positive, based on a first input voltage;

a second voltage generator configured to generate the second power supply voltage, which is negative, based on the first input voltage, and to provide the second power supply voltage to a second power supply voltage line in response to the negative voltage enable signal; and a power management circuit comprising:

an initialization voltage generator configured to generate the initialization voltage based on a second input voltage; and a positive voltage generator configured to generate a positive voltage, and to provide the positive voltage to the second power supply voltage line in response to the positive voltage enable signal.

15. An electronic device comprising a display device comprising:

a display panel comprising data lines, sensing lines, and pixels connected to the data lines and the sensing lines and comprising a light-emitting element; and a panel driver configured to provide a scan signal and a sensing signal to the pixels, to provide data voltages to the pixels through the data lines, to provide an initialization voltage to an anode of the light-emitting element through the sensing lines, to provide a first power supply voltage to the pixels, and to provide a second power supply voltage to a cathode of the light-emitting element of the pixels, wherein the light-emitting element is configured to be initialized based on a voltage difference between the initialization voltage and the second power supply voltage being less than a turn-on voltage of the light-emitting element by a margin voltage, and wherein the panel driver comprises:

a controller configured to generate a positive voltage enable signal and a negative voltage enable signal;

a first voltage generator configured to generate the first power supply voltage, which is positive, based on a first input voltage;

a second voltage generator configured to generate the second power supply voltage, which is negative, based on the first input voltage, and to provide the second power supply voltage to a second power supply voltage line in response to the negative voltage enable signal; and a power management circuit comprising:

an initialization voltage generator configured to generate the initialization voltage based on a second input voltage; and a positive voltage generator configured to generate a positive voltage, and to provide the positive voltage to the second power supply voltage line in response to the positive voltage enable signal.

16. The electronic device of claim 15, wherein the electronic device comprises a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, or a head-mounted display (HMD).

* * * * *